United States Patent
Bae et al.

(10) Patent No.: US 9,628,378 B2
(45) Date of Patent: Apr. 18, 2017

(54) PACKET FORMAT AND COMMUNICATION METHOD OF NETWORK NODE FOR IP ROUTING COMPATIBILITY AND NETWORK NODE THEREFOR

(71) Applicant: Samsung Electronics Co., Ltd., Suwon-si (KR)

(72) Inventors: Young In Bae, Yongin-si (KR); Byoung Joon Lee, Seongnam-si (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 14/090,301

(22) Filed: Nov. 26, 2013

(65) Prior Publication Data

US 2014/0146819 A1     May 29, 2014

(30) Foreign Application Priority Data

Nov. 26, 2012 (KR) ........................ 10-2012-0134453

(51) Int. Cl.
*H04L 12/715* (2013.01)
*H04L 12/725* (2013.01)
*H04L 29/08* (2006.01)

(52) U.S. Cl.
CPC .......... *H04L 45/306* (2013.01); *H04L 67/327* (2013.01)

(58) Field of Classification Search
None
See application file for complete search history.

(56) References Cited

U.S. PATENT DOCUMENTS

| | | |
|---|---|---|
| 2009/0049059 A1 | 2/2009 | Cheah |
| 2009/0285209 A1 | 11/2009 | Stewart et al. |
| 2010/0195653 A1 | 8/2010 | Jacobson et al. |
| 2010/0195655 A1* | 8/2010 | Jacobson et al. ............ 370/392 |
| 2011/0271007 A1* | 11/2011 | Wang et al. .................. 709/238 |
| 2011/0280214 A1 | 11/2011 | Lee et al. |
| 2012/0013524 A1 | 1/2012 | Stuart et al. |
| 2012/0030297 A1 | 2/2012 | Levett |
| 2012/0158912 A1 | 6/2012 | Jacobson |
| 2012/0158973 A1 | 6/2012 | Jacobson et al. |

FOREIGN PATENT DOCUMENTS

| | | |
|---|---|---|
| KR | 10-2008-0057269 A | 6/2008 |
| KR | 10-2011-0118097 A | 10/2011 |
| KR | 10-2011-0125481 A | 11/2011 |
| KR | 10-2012-0020344 A | 3/2012 |
| KR | 10-2012-0038187 A | 4/2012 |

(Continued)

OTHER PUBLICATIONS

International Search Report mailed Mar. 4, 2014 in International Application No. PCT/KR2013/010776 (4 pages, in English).

(Continued)

*Primary Examiner* — Kouroush Mohebbi
(74) *Attorney, Agent, or Firm* — NSIP Law

(57) ABSTRACT

A communication method of a network node for internet protocol (IP) routing compatibility, includes generating a packet including a name of a content that includes first information indicating a location of the content, and second information identifying the content, and transmitting the generated packet.

20 Claims, 9 Drawing Sheets

(56) References Cited

FOREIGN PATENT DOCUMENTS

| | | |
|---|---|---|
| KR | 10-2012-0058782 A | 6/2012 |
| KR | 10-2012-0060565 A | 6/2012 |
| KR | 10-2012-0060566 A | 6/2012 |
| KR | 10-2012-0067949 A | 6/2012 |
| KR | 10-2012-0067953 A | 6/2012 |
| KR | 10-2012-0070410 A | 6/2012 |
| WO | WO 2012/151430 A1 | 11/2012 |

OTHER PUBLICATIONS

Jacobson, Van, et al. "Networking named content." *Proceedings of the 5th international conference on Emerging networking experiments and technologies.* ACM, 2009. (14 pages, in English).
Extended European Search Report issued on Jun. 24, 2016 in counterpart European Patent Application No. 13856395.2 (8 pages, in English).

* cited by examiner

PACKET FORMAT AND COMMUNICATION METHOD OF NETWORK NODE FOR IP ROUTING COMPATIBILITY AND NETWORK NODE THEREFOR

CROSS-REFERENCE TO RELATED APPLICATION

This application claims the benefit under 35 USC 119(a) of Korean Patent Application No. 10-2012-0134453, filed on Nov. 26, 2012, in the Korean Intellectual Property Office, the entire disclosure of which is incorporated herein by reference for all purposes.

BACKGROUND

1. Field

The following description relates to a packet format and a communication method of a network node for Internet Protocol (IP) routing compatibility and the network node therefor.

2. Description of Related Art

The Internet Protocol (IP) is a communications protocol for host-centric, destination address-based packet routing. As an alternative approach to conventional methods, content-centric networking (CCN) supports name-based routing. For example, CCN assigns a hierarchical name to a content and transmits a content request message to another node through prefix matching of hierarchical names. When a corresponding content is found during delivery of the message to a destination, a network node may provide the content through a reverse path. The hierarchical name may be represented by, for example, ABC.com/sait/comm/alice/pic.jpg.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication method of a network node for internet protocol (IP) routing compatibility, includes generating a packet including a name of a content that includes first information indicating a location of the content, and second information identifying the content, and transmitting the generated packet.

The first information may include an IP address, or a unique number, or a unique character, or a unique number string, or a unique character string, or any combination thereof, of a network node in which the content is stored.

The second information may include a hierarchical name of the content.

A portion of the first information or the second information may include a globally routable name.

The packet may be generated in a form of a content-centric network packet or an information-centric network packet.

The packet may correspond to an IP packet, and the packet may include a data field including a destination address field including the first information, and an options and padding field including the second information.

The packet may correspond to an IP packet, and the packet may include a data field including an options and padding field that includes the first information and the second information.

A non-transitory computer-readable storage medium may store a program including instructions to cause a computer to perform the method.

In another general aspect, a communication method of a network node for internet protocol (IP) routing compatibility, includes receiving a packet including a name of a content that includes first information indicating a location of the content, and second information identifying the content, and extracting the second information from the packet. The method further includes forwarding the packet to another network node based on whether the content corresponding to the second information is stored in the network node.

The method may further include determining whether the packet corresponds to a content-centric network packet.

The method may further include determining whether the packet corresponds to a content-centric network (CCN) packet based on a protocol field of an IP header of the packet.

The method may further include determining whether the content corresponding to the second information is present in a content store (CS) in response to the packet being determined to correspond to the CCN packet, and transmitting the content based on a result of the determining of whether the content corresponding to the second information is present in the CS.

The method may further include determining whether information of an interface that corresponds to the second information is present in a pending interest table (PIT) in response to the content corresponding to the second information being determined to be absent in the CS, and updating the PIT with information of an incoming interface from which the packet is received based on a result of the determining of whether the information of the interface that corresponds to the second information is present in the PIT.

The method may further include forwarding the packet to an interface of an entry matching the first information among entries of a forwarding information base in response to the information of the interface that corresponds to the second information being determined to be absent in the PIT.

Other features and aspects will be apparent from the following detailed description, the drawings, and the claims.

Figure 1:
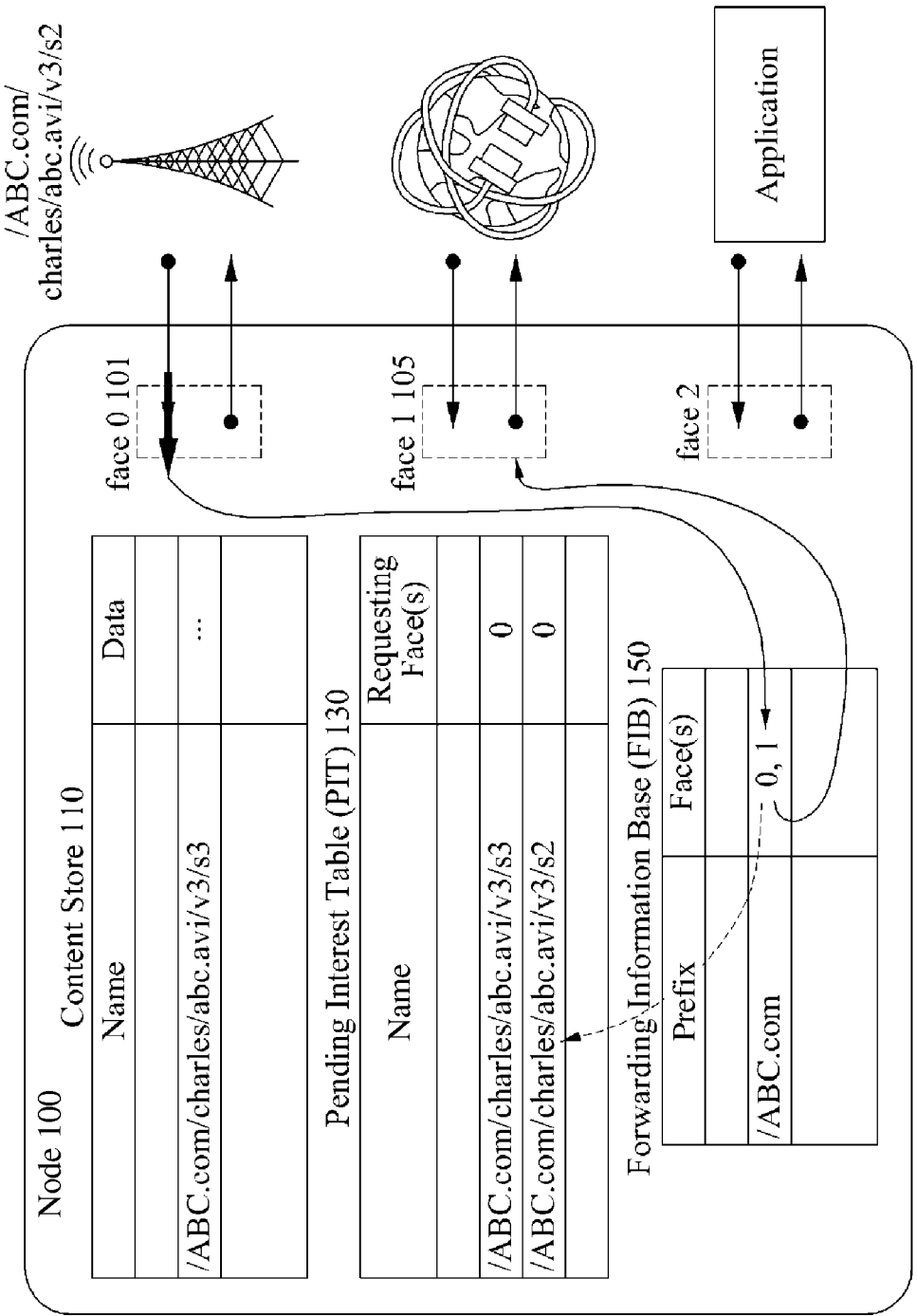
FIG. 1 is a diagram illustrating an example of processing a content request packet in a content-centric network, according to a related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of processing a content request packet in a content-centric network (CCN), according to a related art. In the CCN or a name-based network, a name of a content may perform a compass function to locate a node in which the content is stored, and may be used to identify the content. Accordingly, each content has a unique name. Two contents having different names may be recognized to be different contents although the two contents are identical. For example, when contents of two files are identical but have different content names of "/ABC.com/sait/video/intro.avi" and "/ABC.com/sait/comm/video/intro.avi", respectively, the contents of the files may be recognized to be different. The preceding rule may be useful for distinguishing different contents having similar content names. Hereinafter, processing of a content request packet to retrieve a corresponding content based on a hierarchical name of the content in the CCN is described.

For example, when an CCN node 100 receives a content request packet that requests a content with a hierarchical name "/ABC.com/charles/abc.avi/v3/s2" from a face 0 101, a networking module of the node 100 determines whether the content is present in a content store (CS) 110 of the node 100 based on the hierarchical name of the content, "/ABC.com/charles/abc.avi/v3/s2". The face may be expressed as an interface. The CS 110 may be also termed a contents cache.

When the content is determined to be present in the CS 110, the node 100 transmits the content to the face 0 101 from which the content request packet is received. When the content is determined to be absent in the CS 110, the node 100 determines whether an entry stored with the same content name "/ABC.com/charles/abc.avi/v3/s2" is present in a pending interest table (PIT) 130 of the node 100.

When the entry stored with the same content name is present in the PIT 130, the node 100 adds information of a face from which the content request packet is received, in this example, the face 0 101, to the corresponding entry in the PIT 130. When the entry stored with the same content name is absent in the PIT 130, the node 100 looks up an entry stored with the same prefix (e.g., "/ABC.com") of the content name "/ABC.com/charles/abc.avi/v3/s2" in a forwarding information base (FIB) 150. In this example, the node 100 may use a longest prefix matching when conducting a search for the entry.

When the entry stored with the same prefix is found in the FIB 150, node 100 determines a face to which the content request packet is to be forwarded, for example, a face 1 105, based on information registered in the found entry in the FIB 150, and forwards the content request packet to the determined face 1 105. Also, the node 100 registers, in the corresponding entry in PIT 130, the information of the face 0 101 from which the content request packet is received. The registration is performed to forward a data packet including the content requested by the content request packet to a node requesting the content when the data packet is received. Accordingly, the face from which the content request packet is received, in this example, the face 0 101, is excluded from the determining of a face to which the content request packet is to be forwarded based on the FIB 150.

Figure 2:
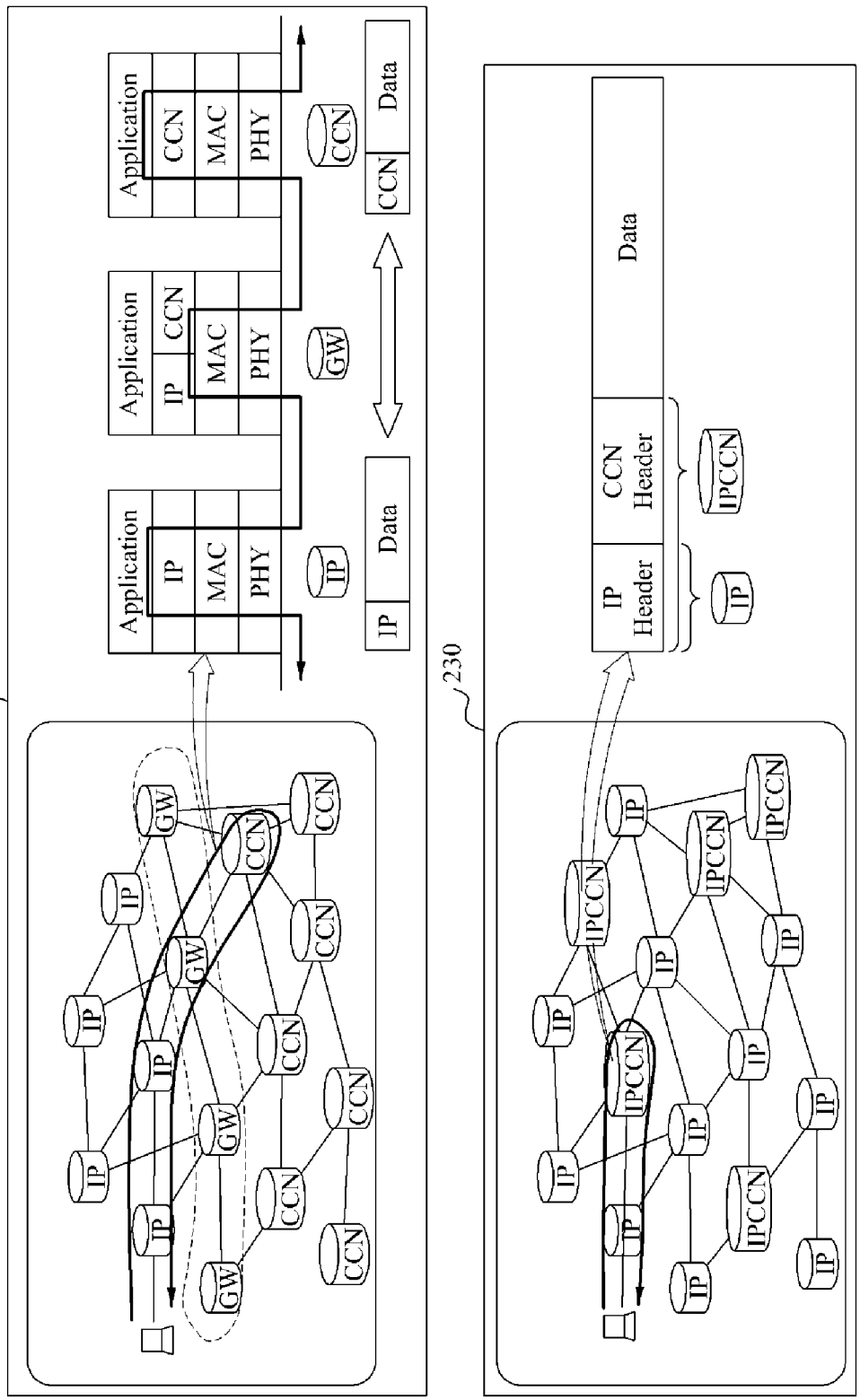
FIG. 2 is a diagram illustrating an example of packet forwarding and processing in a content-centric network, and packet forwarding and processing in a network including a network node for Internet Protocol (IP) routing compatibility.

FIG. 2 is a diagram illustrating an example of packet forwarding and processing in an CCN 210, and packet forwarding and processing in a network 230 including a network node for Internet Protocol (IP) routing compatibility. Referring to FIG. 2, in the CCN 210, a gateway (GW) is needed to convert a packet format for association of an IP network device and an CCN network device. However, in the network 230 including a network node for the IP routing compatibility, namely, an IPCCN device, a need for a gateway to convert a packet format for association of an IP network device and an CCN network device is eliminated.

In detail, in the network 230, an IP device including a processing module for an IP packet may recognize and process an IP packet including an IP header and data. Also, an IPCCN device including a processing module for an IP packet and an CCN packet may process an CCN packet including an CCN header and data, as well as an IP packet. Accordingly, a need for packet format conversion is eliminated in the network 230 for the IP routing compatibility.

Figure 3:
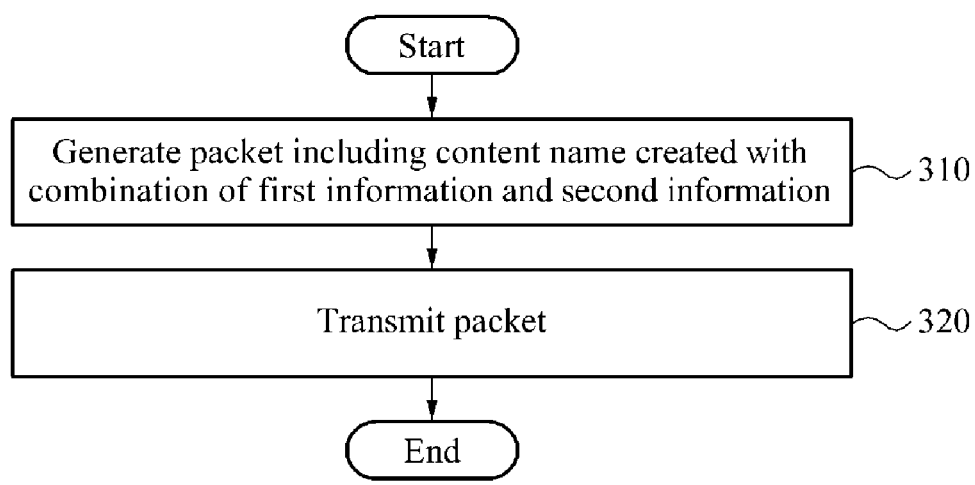
FIG. 3 is a flowchart illustrating an example of a communication method of a network node for IP routing compatibility.

FIG. 3 is a flowchart illustrating an example of a communication method of a network node for IP routing compatibility. Referring to FIG. 3, in operation 310, the network node for the IP routing compatibility, hereinafter referred to as a network node, generates a packet including a name of a content that is created with a combination of first information indicating a location of the content and second information identifying the content. The location of the content may be understood to be a location of a network node in which the content is stored.

For example, the network node may generate a packet including a name of a content, "202.23.101.22/(/ABC.com/sait/comm/alice/pic.jpg/v01/s00)", which is created with a combination of first information indicating a location of the content, for example, "202.23.101.22", and second information identifying the content, for example, "/ABC.com/sait/comm/alice/pic.jpg/v01/s00". The first information may include an IP address of the network node in which the content is stored, a unique number allocated to the network node in which the content is stored, a unique character allocated to the network node in which the content is stored, a unique number string, and/or a unique character string allocated to the network node in which the content is stored. The second information may include a hierarchical name of the content. At least a portion of the first information or the second information may include a globally routable name, i.e., a name that may be routed to all devices or nodes.

In operation 320, the network node transmits the packet generated in operation 310. The packet may be generated or provided in a form of an CCN packet or an information-centric network (ICN) packet.

The packet may include a name of a content, including information indicating a region or a location of the network node in which a globally routable organization, company, and/or terminal is located, or the first information, before the second information identifying the content, for example, an CCN address. That is, the packet may include a name of a content that is created with a combination of a locator and an identifier. Accordingly, using a packet including a name of a content that is created with a combination of first information, for example, an IP address, and second information, for example, a hierarchical name of the content, name-based content lookup may be implemented as well as IP-based packet forwarding.

Figure 4:
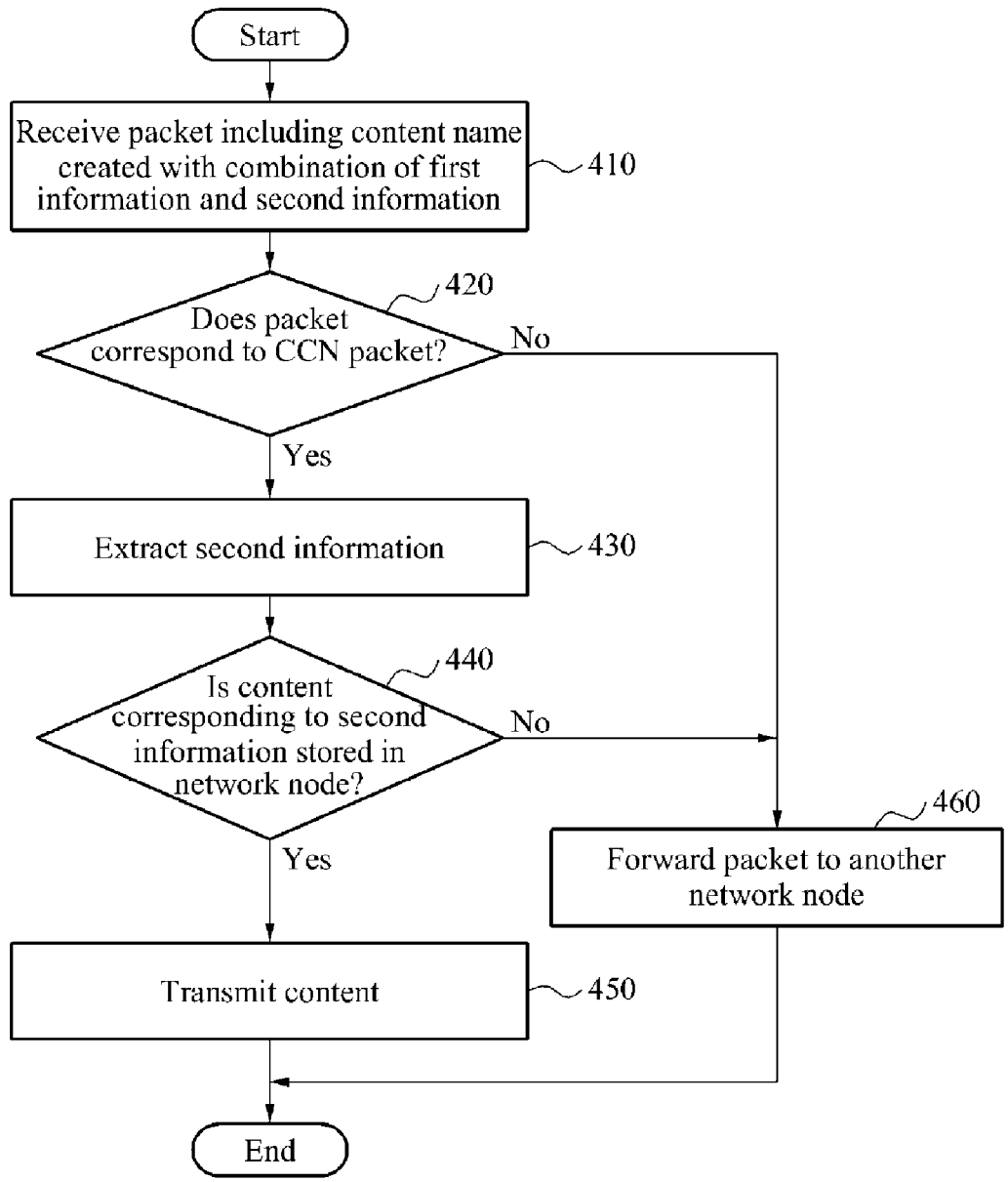
FIG. 4 is a flowchart illustrating another example of a communication method of a network node for IP routing compatibility.

FIG. 4 is a flowchart illustrating another example of a communication method of a network node for IP routing compatibility. Hereinafter, the network node for the IP routing compatibility may correspond to the IPCCN device of FIG. 2 including the processing module for an IP packet and an CCN packet.

Referring to FIG. 4, in operation 410, the network node receives, from a network node requesting a content, a packet including a name of the content that is created by a combination of first information indicating a location of the content and second information identifying the content.

In operation 420, the network node determines whether the packet received in operation 410 corresponds to an CCN packet. For example, the network node may determine whether the received packet corresponds to an CCN packet, by detecting an upper-layer protocol of an IP header of the received packet through information included in a next protocol field of the IP header. When the received packet is determined to correspond to an CCN packet, the network node continues in operation 430. Otherwise, the network node continues in operation 460.

In operation 430, the network node extracts, from the packet, the second information identifying the content, for example, a hierarchical name of the content.

In operation 440, the network node determines whether the content corresponding to the second information is stored in the network node, by looking up the content corresponding to the second information in an CS of the network node. When the content corresponding to the second information is determined to be stored in the network node, the network node continues in operation 450. Otherwise, the network node continues in operation 460.

In operation 450, the network node transmits the content corresponding to the second information to the network node requesting the content.

In operation 460, the network node forwards the received packet to another network node.

Figure 5:
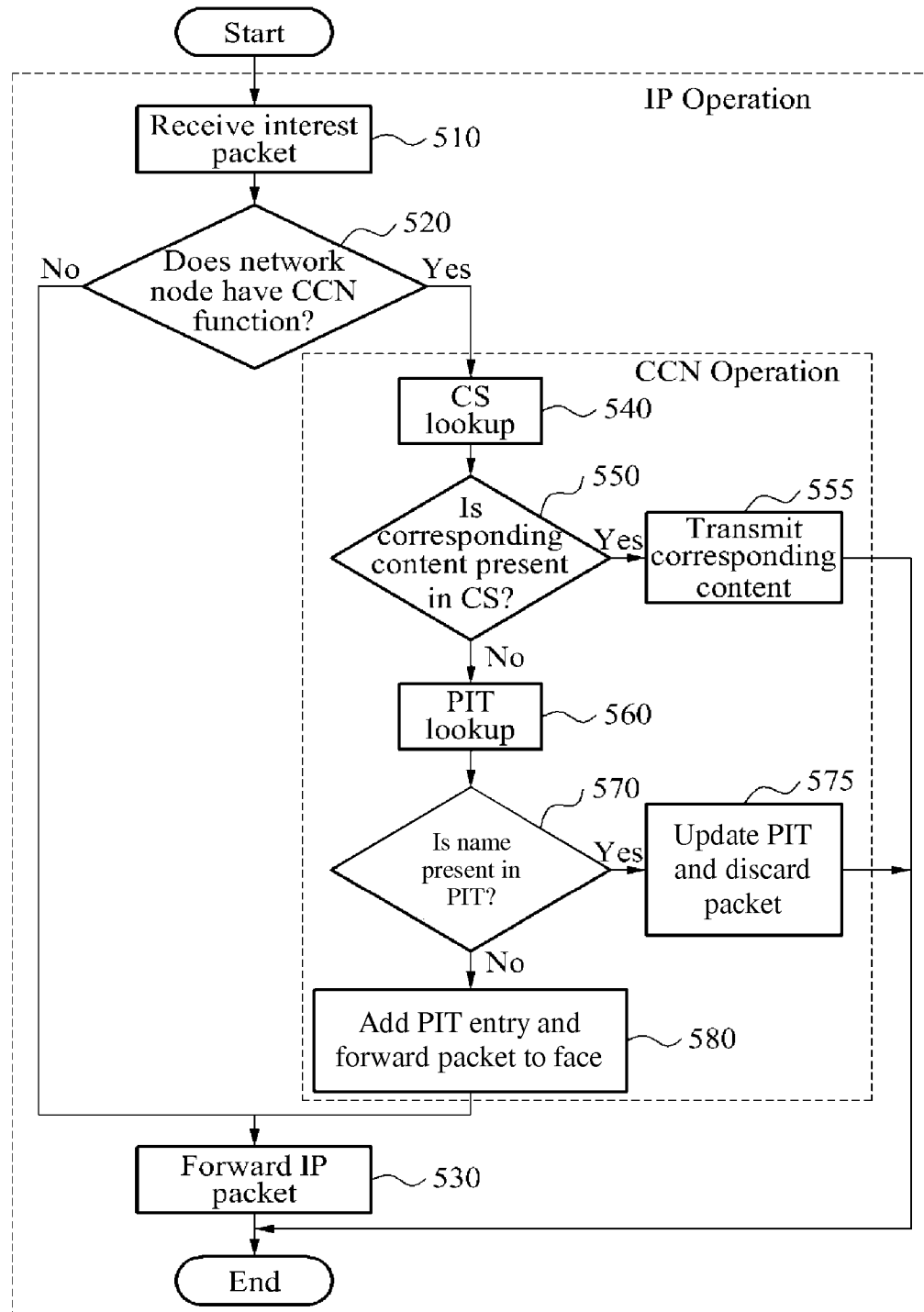
FIG. 5 is a flowchart illustrating still another example of a communication method of a network node for IP routing compatibility.

FIG. 5 is a flowchart illustrating still another example of a communication method of a network node for IP routing compatibility. Referring to FIG. 5, the network node processes, in a forwarding engine, a packet including a name of a content that is created with a combination of first information and second information.

In operation 510, the network node receives a content request packet, namely, an interest packet. For example, the content request packet may include a name of a content that is created with a combination of first information indicating a location of the content and second information for identifying the content.

In operation 520, the network node determines whether the network node has an CCN processing function. For example, the network node may determine whether the network node includes a processing module for an IP packet and an CCN packet. In another example, the network node may determine whether the network node has the CCN processing function, by detecting a protocol field of an IP packet. When the network node is determined to have the CCN processing function, the network node continues in operation 540. Otherwise, the network node continues in operation 530.

In operation 530, the network node recognizes the received packet to be an IP packet, and forwards the IP packet to another network node. In this example, the network node performs an IP operation.

In operation 540, the network node looks up or searches an CS of the network node to determine whether the content corresponding to the second information is present in the CS of the network node. For example, the network node may search the CS, using an identifier or the second information identifying the content. The identifier may be represented by, for example, "ABC.com/sait/comm/alice/pic.jpg".

In operation 550, the network node determines whether the content corresponding to the second information is present in the CS. When the content corresponding to the second information is determined to be present in the CS, the network node continues in operation 555. Otherwise, the network node continues in operation 560.

In operation 555, the network node transmits the content corresponding to the second information through a reverse path.

In operation 560, the network node looks up or searches an PIT of the network node to determine whether the second information and/or information of a face that corresponds to the second information is present in the PIT of the network node. For example, the PIT may represent that the network node awaits a response to a request for the same content that has passed through the network node. In this example, the PIT may store the second information of the same content and/or information of a face through which the request for the same content is received.

In operation 570, the network node determines whether the second information (e.g., a hierarchical name of the content, "samsung.com/sait/comm/alice/pic.jpg") and/or information of the face that corresponds to the second information is present in the PIT. When the second information is determined to be present in the PIT, the network node continues in operation 575. Otherwise, the network node continues in operation 780.

In operation 575, the network node updates the PIT with information of an incoming face from which the content request packet is received. For example, when the information of the face that corresponds to the second information is determined to be present in the PIT, the network node may update the information of the face in an entry of the PIT that corresponds to the second information, with the information of the incoming face from which the content request packet is received. When the information of the face that corresponds to the second information is determined to be not present in the PIT, the network node may add, to the entry of the PIT that corresponds to the second information, the information of the incoming face from which the content request packet is received. Also, since the request for the same content has arrived at the network node and is transmitted to another node, by referring to an FIB of the network node, the network node discards the corresponding content request packet. Operations 540 through 575 may be performed using the second information included in the packet, for example, the hierarchical name of the content.

In operation 580, the network node forwards the corresponding content request packet to a face of an entry "202.23.101.22" in the FIB that matches the first information, for example, an IP address "202.23.101.22", through a longest prefix match. Also, the network node updates the PIT, by adding an entry of the PIT that corresponds to the second information and includes the information of the incoming face from which the content request packet is received. For example, each entry of the FIB may include an IP address and a corresponding current face, and may be periodically and dynamically updated by IP routing protocols, such as, e.g., Intermediate System to Intermediate System (IS-IS), Open Shortest Path First (OSPF), and/or other protocols known to one of ordinary skill in the art. Accordingly, by managing entries in the FIB, using IP addresses, a smaller number of routing entries than an example using a content name may be needed, and routing scalability may be ensured.

After the network node performs an CCN operation through operations 540 through 580, in operation 530, the network node forwards the IP packet to another network node.

Figure 6:
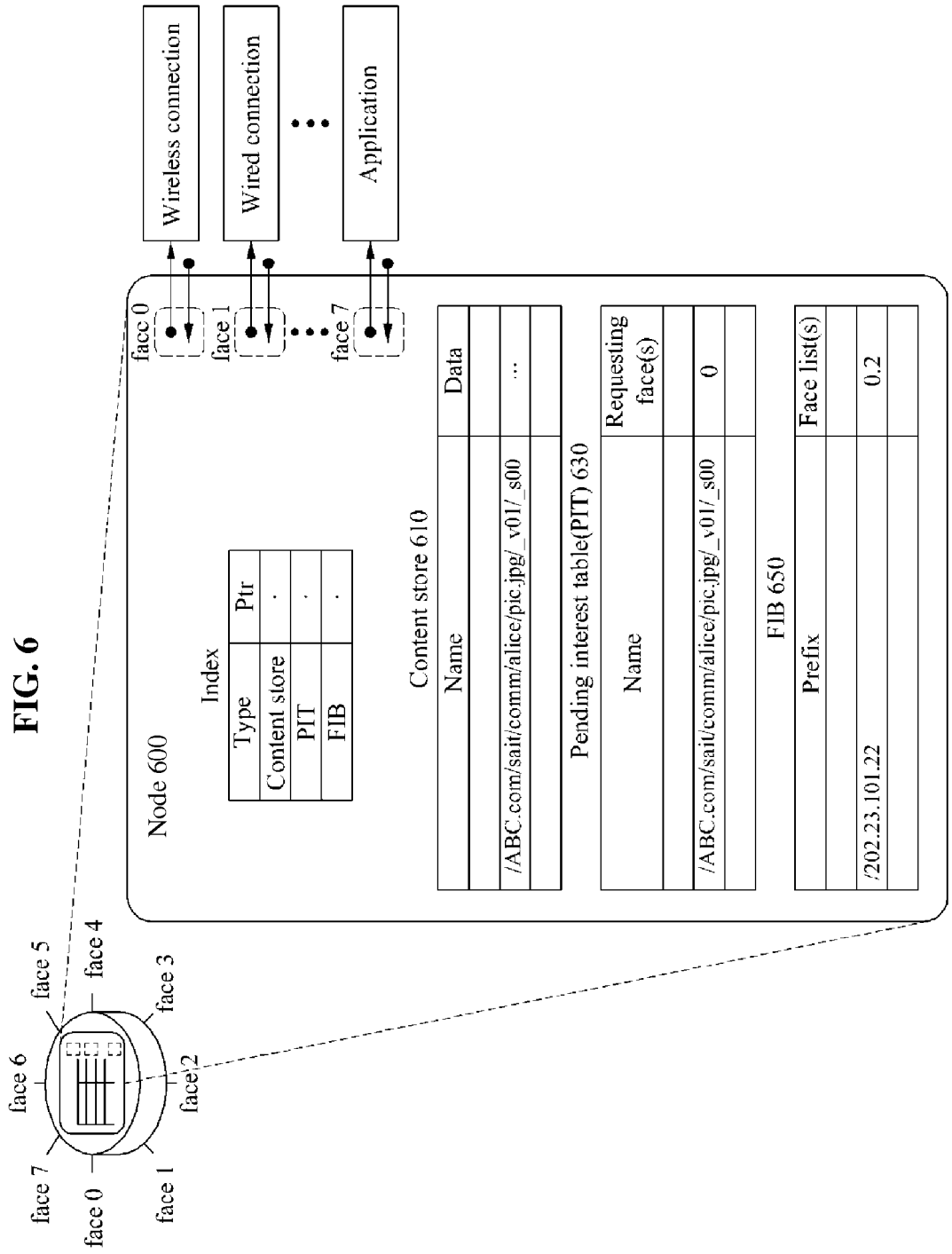
FIG. 6 is a diagram illustrating an example of a forwarding engine model of a network node for IP routing compatibility.

FIG. 6 is a diagram illustrating an example of a forwarding engine model of a network node 600 for IP routing compatibility. Referring to FIG. 6, the forwarding engine model of the network node 600 includes an CS 610, an PIT 630, an FIB 650, and indexes for the CS 610, the PIT 630, and the FIB 650.

The network node 600 receives a packet including a name of a content that is created with a combination of first information indicating a location of the content and second information identifying the content. The first information may include an IP address of a network node in which the content is stored, a unique number allocated to the network node in which the content is stored, a unique character allocated to the network node in which the content is stored, a unique number string allocated to the network node in which the content is stored, and/or a unique character string allocated to the network node in which the content is stored. The second information may include a hierarchical name of the content.

The CS 610 may store the content corresponding to the second information identifying the content.

The PIT 630 may represent that the corresponding content is requested by the network node 600, using the second information, when the corresponding content is absent in the CS 610. An entry of the PIT 630 that corresponds to the second information may be added or updated with information of an incoming face from which the packet is received.

The FIB 650 may store the first information indicating the location of the content and a face in an entry matching the first information. Also, the FIB 650 may be used to forward the packet to the face corresponding to the first information when an entry corresponding to the second information is absent in the PIT 630.

As described in the foregoing, the CS 610 and the PIT 630 may be managed in a similar manner as described with reference to FIG. 1. However, the entry of the FIB 150 is maintained with the prefix "/ABC.com/" in the example of FIG. 1, whereas the entry of the FIB 650 is mapped to an IP address "202.23.101.22" in the example of FIG. 6. That is, the CS 610, the PIT 630, and the FIB 650 may be managed in a similar manner as described with reference to FIG. 5. Accordingly, a basic CCN structure may be maintained with a smaller number of routing entries, by managing entries of the FIB 650, using IP addresses.

Figure 7:
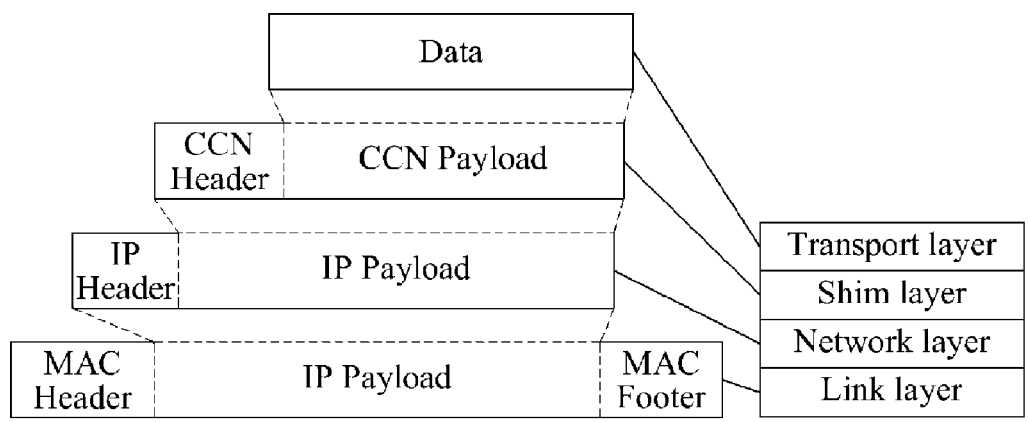
FIG. 7 is a diagram illustrating an example of a packet for IP routing compatibility in a protocol stack.

FIG. 7 is a diagram illustrating an example of a packet for IP routing compatibility in a protocol stack. Referring to FIG. 7, the packet for the IP routing compatibility includes an IP header, a CCN header, and at least one of an IP payload, a CCN payload, and data. The diagram shows a position of the packet for the IP routing compatibility in a network protocol stack or a network layer when the packet for the IP routing compatibility is used in an IP protocol.

Figure 8:
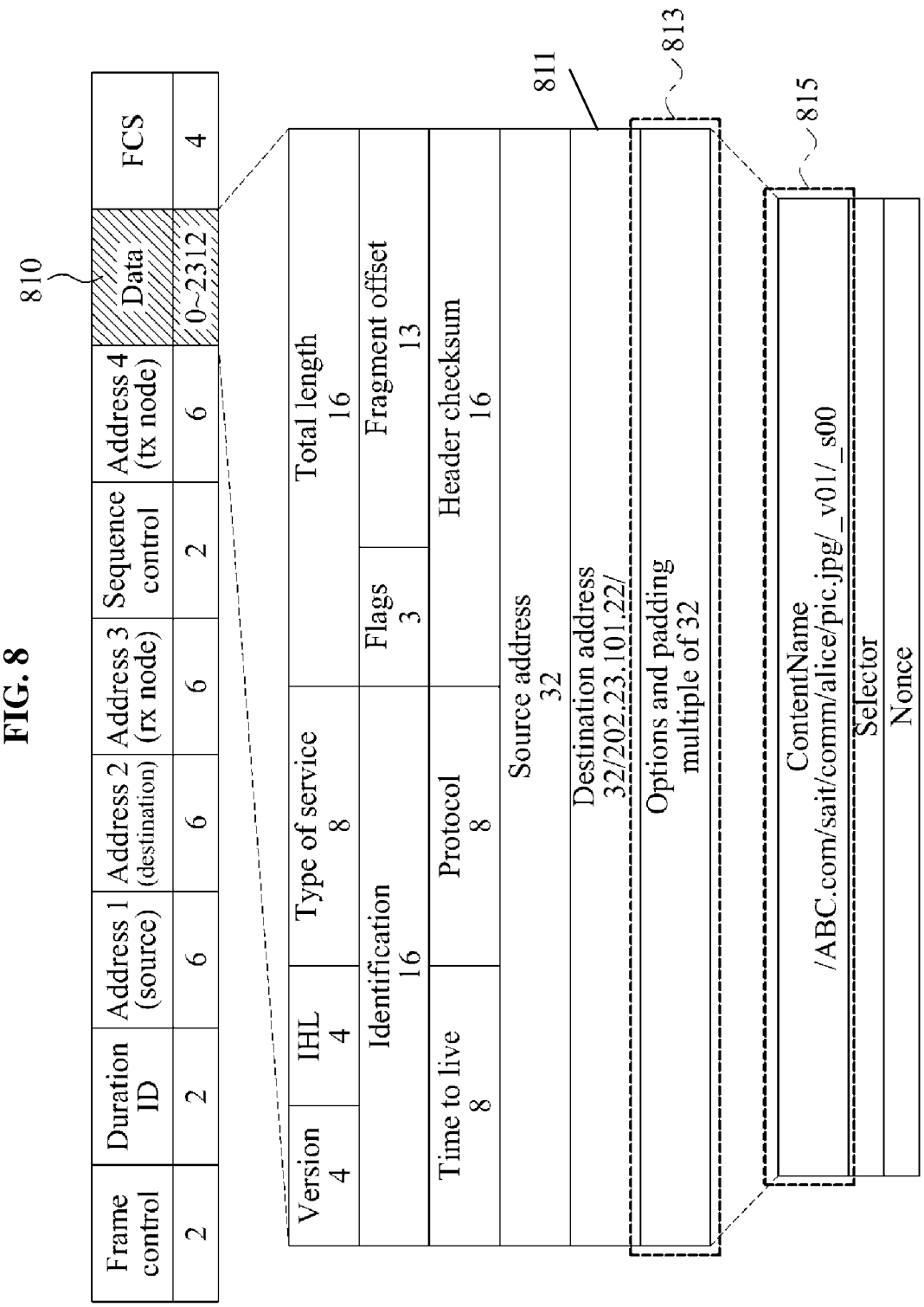
FIG. 8 is a diagram illustrating an example of a packet format for IP routing compatibility.

FIG. 8 is a diagram illustrating an example of a packet format for IP routing compatibility. Referring to FIG. 8, the packet format when a packet for the IP routing compatibility is used in an IP protocol is illustrated.

Since an CCN packet begins with a name according to characteristics of the CCN packet, first information indicating a location of a content is included in a destination address field 811 of a data field 810 of an IP packet. An options and padding field 813 of the data field 810 of the IP packet includes a remaining CCN content name 815, namely, second information identifying the content (e.g., "samsung.com/sait/comm/alice/pic.jpg/_v01/s00"), selector information, and nonce information. According to other examples, the options and padding field 813 of the data field 810 of the IP packet may include a content name created with a combination of the first information indicating the location of the content and the second information identifying the content.

The data field 810 of the IP packet may be configured in different formats based on whether a router conducts hardware-based processing or software-based processing, and according to an example, both may be supported. In this example, a corresponding packet may be identified in an upper layer. The corresponding packet may be identified to be an CCN packet, using a protocol field of a header format of the IP packet. For this purpose, an CCN protocol may be registered in an Internet Assigned Numbers Authority (IANA).

In a protocol stack, an CCN layer specifying routing for a packet including a name of a content created with a combination of first information and second information may replace a transport layer. The CCN layer may correspond to a shim layer between a network layer and the transport layer.

Figure 9:
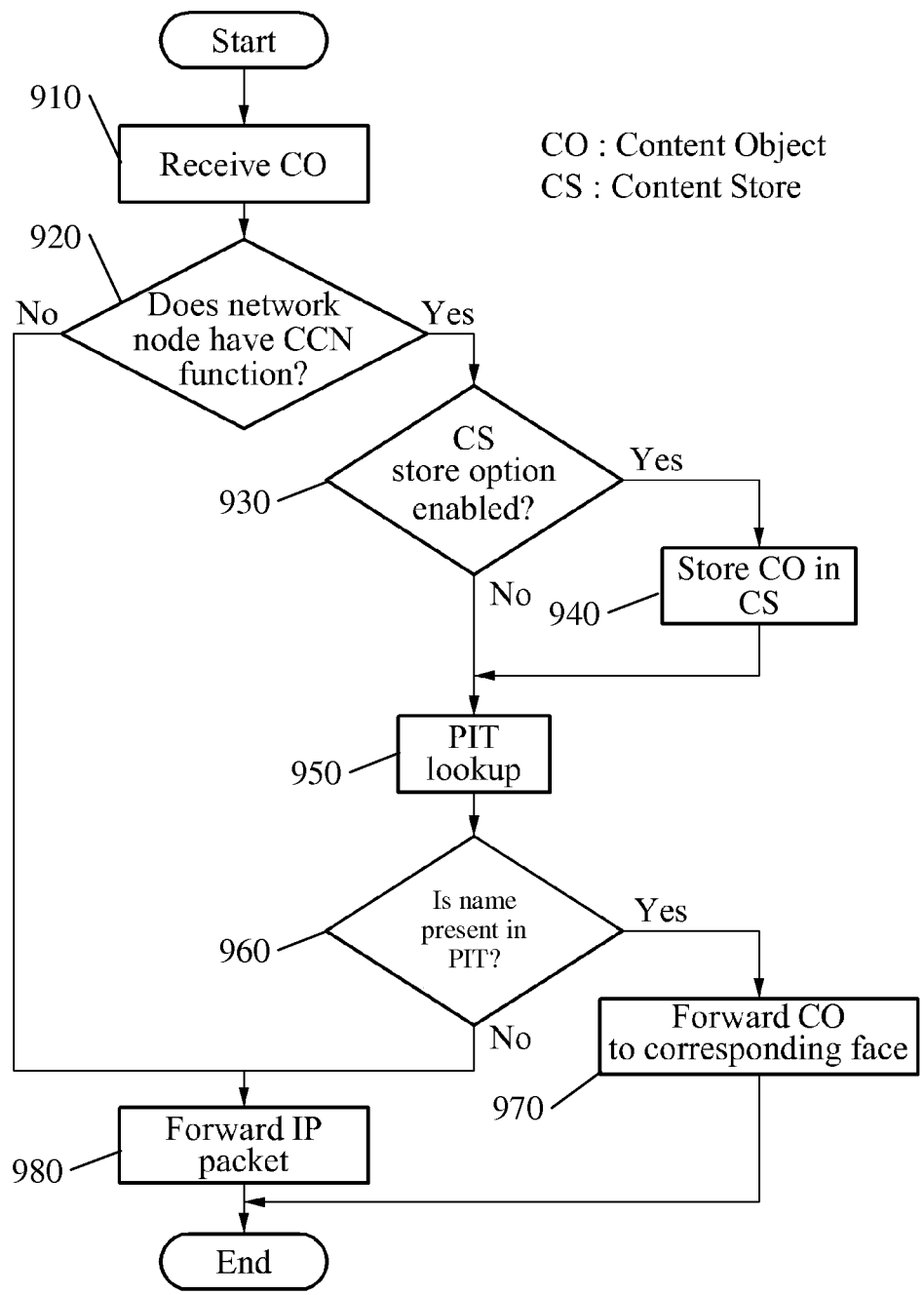
FIG. 9 is a flowchart illustrating yet another example of a communication method of a network node for IP routing compatibility.

FIG. 9 is a flowchart illustrating yet another example of a communication method of a network node for IP routing compatibility. In operation 910, the network node receives a content object from another network node.

In operation 920, the network node determines whether the network node has an CCN processing function. For example, the network node may determine whether the network node includes a processing module for an IP packet and an CCN packet. In another example, the network node may determine whether the network node has the CCN processing function, by detecting a protocol field of an IP packet. When the network node is determined to have the CCN processing function, the network node continues in operation 930. Otherwise, the network node continues in operation 980.

In operation 930, the network node determines whether an CS option is enabled in the network node. When the CS option is determined to be enabled in the network node, the network node continues in operation 940. Otherwise, the network node continues in operation 950.

In operation 940, the network node stores the content object in an CS of the network node.

In operation 950, the network node looks up or searches an PIT of the network node to determine whether a hierarchical name of the content object is present in the PIT. For example, the PIT may store the hierarchical name of the content object and/or information of a face through which a request for the content object is received.

In operation 960, the network node determines whether the hierarchical name of the content object is present in the PIT. When the hierarchical name of the content object is determined to be present in the PIT, the network node continues in operation 970. Otherwise, the network node continues in operation 980.

In operation 970, the network node forwards the content object to the face corresponding to the hierarchical name of the content object in the PIT. The face is through which the request for the content object is received.

In operation 980, the network node recognizes the received content object to be an IP packet, and forwards the IP packet to another network node.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method of a network node for internet protocol (IP) routing compatibility, the method comprising:
   generating a packet comprising a name of a content that comprises first information indicating a network location of another network node in which the content is stored, and second information identifying the content; and
   transmitting the generated packet to a receiving network node,
   wherein the first information is used to determine an interface of the receiving network node to forward the packet,
   and wherein the receiving network node accesses a forwarding information base with the first information to find the interface.

2. The method of claim 1, wherein the first information comprises an IP address, or a unique number, or a unique character, or a unique number string, or a unique character string, or any combination thereof, of a network node in which the content is stored.

3. The method of claim 1, wherein the second information comprises a hierarchical name of the content.

4. The method of claim 1, wherein a portion of the first information or the second information comprises a globally routable name.

5. The method of claim 1, wherein the packet is generated in a form of a content-centric network packet or an information-centric network packet.

6. The method of claim 1, wherein:
   the packet corresponds to an IP packet; and
   the packet comprises a data field comprising
   a destination address field comprising the first information, and
   an options and padding field comprising the second information.

7. The method of claim 1, wherein:
   the packet corresponds to an IP packet, and
   the packet comprises a data field comprising an options and padding field that comprises the first information and the second information.

8. A non-transitory computer-readable storage medium storing a program comprising instructions to cause a computer to perform the method of claim 1.

9. A communication method of a network node for internet protocol (IP) routing compatibility, the method comprising:
   receiving a packet, comprising a name of a content, that comprises first information indicating a network location of another network node in which the content is stored, and second information identifying the content;
   extracting the second information from the packet; and
   forwarding the packet to a network node that corresponds to the first information based on whether the content corresponding to the second information is accessible by the network node using the second information,
   wherein the forwarding accesses a forwarding information base with the first information to find the network node that corresponds to the first information.

10. The method of claim 9, further comprising:
    determining whether the packet corresponds to a content-centric network packet.

11. The method of claim 9, further comprising:
    determining whether the packet corresponds to a content-centric network (CCN) packet based on a protocol field of an IP header of the packet.

12. The method of claim 11, further comprising:
    determining whether the content corresponding to the second information is present in a content store (CS) in response to the packet being determined to correspond to the CCN packet; and
    transmitting the content based on a result of the determining of whether the content corresponding to the second information is present in the CS.

13. The method of claim 12, further comprising:
    determining whether information of an interface that corresponds to the second information is present in a pending interest table (PIT) in response to the content corresponding to the second information being determined to be absent in the CS; and
    updating the PIT with information of an incoming interface from which the packet is received based on a result of the determining of whether the information of the interface that corresponds to the second information is present in the PIT.

14. The method of claim 13, further comprising:
forwarding the packet to an interface of an entry matching the first information among entries of a forwarding information base in response to the information of the interface that corresponds to the second information being determined to be absent in the PIT.

15. A network node for internet protocol (IP) routing compatibility, the network node comprising:
- a content store (CS) configured to store a content corresponding to second information identifying the content; and
- a forwarding information base configured to store information of an interface that corresponds to first information indicating a network location of another network node in which the content is stored, and be used to forward, to the interface, a packet comprising the first information and the second information in response to an entry corresponding to the second information being absent in a pending interest table (PIT).

16. The network node of claim 15, wherein the PIT is configured to indicate that the content has been requested by the network node, using the second information, in response to the content being absent in the CS.

17. The network node of claim 15, wherein the network node is configured to update, in the PIT, information of an incoming interface from which the packet is received based on the second information.

18. The network node of claim 15, wherein the packet comprises a name of the content that comprises the first information and the second information.

19. The network node of claim 15, wherein the first information comprises an IP address, or a unique number, or a unique character, or a unique number string, or a unique character string, or any combination thereof, of a network node in which the content is stored.

20. The network node of claim 15, wherein the second information comprises a hierarchical name of the content.

* * * * *